United States Patent [19]

Cusick et al.

[11] Patent Number: 5,548,611
[45] Date of Patent: Aug. 20, 1996

[54] METHOD FOR THE MELTING, COMBUSTION OR INCINERATION OF MATERIALS AND APPARATUS THEREFOR

[75] Inventors: Michael J. Cusick, Englewood; Michael A. Weinstein, Boulder; Leonard E. Olds, Castle Rock, all of Colo.

[73] Assignee: Schuller International, Inc., Denver, Colo.

[21] Appl. No.: 233,734

[22] Filed: May 5, 1994

Related U.S. Application Data

[63] Continuation-in-part of Ser. No. 64,197, May 19, 1993, abandoned.

[51] Int. Cl.$^6$ .................................................. H05B 7/00
[52] U.S. Cl. .............................. 373/18; 373/20; 373/22; 432/13
[58] Field of Search ................... 373/18–20, 22, 373/24, 25, 27; 48/61, 65, 77, 92; 75/10.19; 219/121.59; 65/27, 134.7, 335, 135; 432/13, 156

[56] References Cited

U.S. PATENT DOCUMENTS

| | | | |
|---|---|---|---|
| 4,141,694 | 2/1979 | Camacho | 48/61 |
| 4,545,798 | 10/1985 | Matesa | 65/27 |
| 4,546,483 | 10/1985 | Lugscheider et al. | 373/24 |
| 4,654,076 | 3/1987 | Camacho et al. | 75/10.19 |
| 4,671,765 | 6/1987 | Tsai | 432/13 |
| 4,694,464 | 9/1987 | Camacho Salvador L. | 373/22 |
| 5,028,248 | 7/1991 | Williams et al. | 65/134.7 |
| 5,104,432 | 4/1992 | Williams et al. | 65/436 |
| 5,256,855 | 10/1993 | Heanley et al. | 219/121.59 |

OTHER PUBLICATIONS

Michael J. Cusick; Remotely Coupled Transferred Arc Plasma For Materials Processing And Synthesis; pp. 64–69; Mar., 1992; Industrial Heating.

*Primary Examiner*—Tu Hoang
*Attorney, Agent, or Firm*—Cornelius P. Quinn

[57] ABSTRACT

A plasma arc melter which is equipped with at least two transferred arc plasma torches of opposite polarities is used to melt normal batch materials for producing glass, ceramics, refractories and other such materials and for the recycling, combustion and/or vitrifying incineration of waste materials. To enhance the stability of the plasma jets, the anode torch is positioned farther above the surface of the materials being processed than the cathode torch and the materials being processed are introduced into the melter so that the materials first pass beneath the cathode torch. An oxidizing gas can be introduced into the zone between the torches in the region of the plasma jets to enhance the combustion process. For waste materials with a high organic content, a plasma arc afterburner can be used to further treat the exhaust gases from the melter.

26 Claims, 5 Drawing Sheets

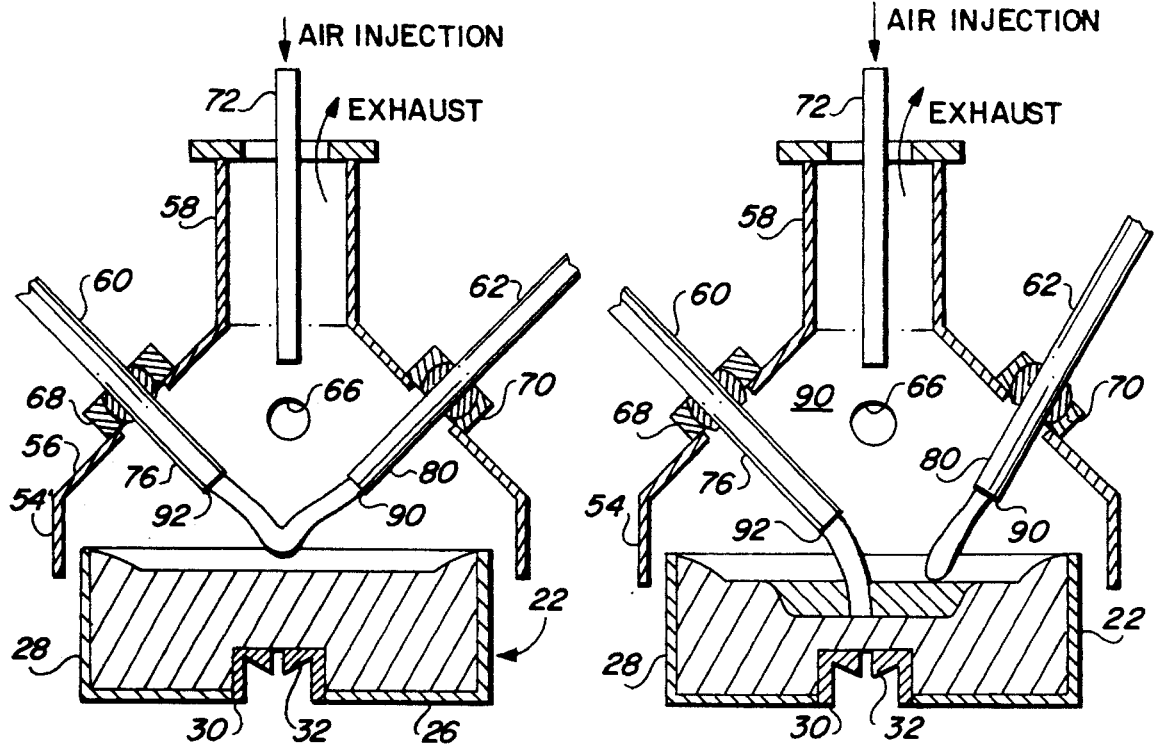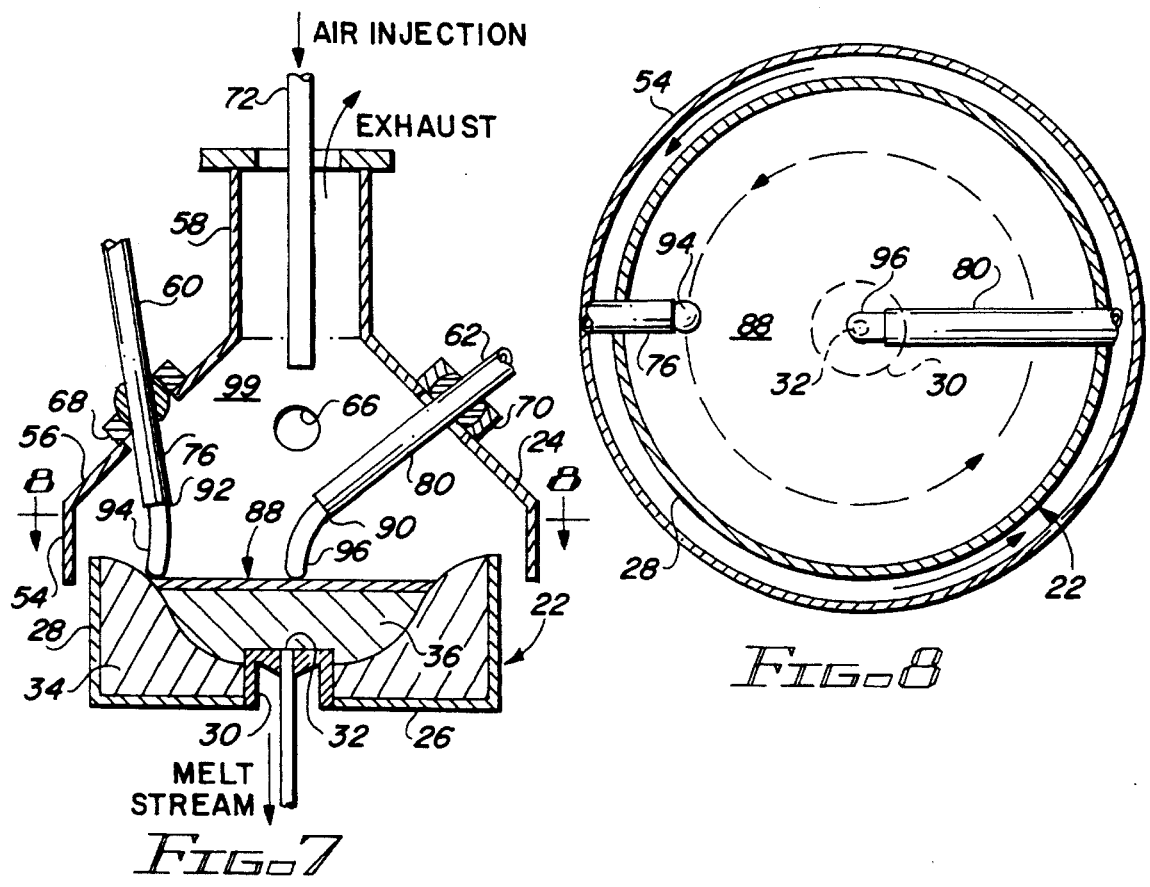

METHOD FOR THE MELTING, COMBUSTION OR INCINERATION OF MATERIALS AND APPARATUS THEREFOR

BACKGROUND OF THE INVENTION

This application is a continuation-in-part of application Ser. No. 08/064,197, filed May 19, 1993, entitled METHOD FOR THE MELTING, COMBUSTION OR INCINERATION OF MATERIALS AND APPARATUS THEREFOR.

The present invention relates to plasma arc melters and more specifically to an improved plasma arc melter for melting materials, such as glasses and ceramics, and for the recycling, combustion and/or vitrifying incineration of waste materials.

U.S. Pat. No. 5,028,248, issued Jul. 2, 1991, relates to a method of and apparatus for melting materials, such as glass, refractory oxides, silicates and other essentially non-metalliferous materials, including the various batch materials for rock wool manufacture, in a plasma arc furnace which is equipped with at least two transferred-arc plasma torches. The disclosure of U.S. Pat. No 5,028,248, is hereby incorporated herein by reference.

The present invention is an improved method of and apparatus for melting materials in a plasma arc furnace equipped with at least two transferred-arc plasma torches which can be used to melt materials such as those enumerated above. In addition, the method and apparatus of the present invention are directed to the disposal of or the recycling, combustion and/or vitrifying incineration of waste materials.

There continues to be a need to efficiently and effectively melt and process materials such as glasses, ceramics, oil shale, oily sands, carbonaceous shales and carbonaceous gold ores and the method and apparatus of the '248 patent and the improved method and apparatus of the present invention provide efficient and effective processes to meet those needs. In addition, the disposal, recycling, combustion and/or vitrifying incineration of industrial, commercial, municipal and other wastes poses an ever increasing problem in our society.

The efficient and effective disposal of potentially hazardous waste materials such as, contaminated soils, PCB'S, asbestos wastes, medical wastes, incinerator ash and municipal wastes can greatly enhance the quality of life in our industrialized society. Other waste materials including fiber glass scrap, discarded end-user products, inconsistent-composition glass cullet, waste liquors, organic-bearing metallic scrap and organic-bearing metallic/ceramic composites, pose another problem. With available land fill sites for disposing of such wastes becoming increasingly scarce and the exorbitant and rapidly increasing costs associated with the use of land fill sites, the development of a practical, effective and efficient method and apparatus for recycling such wastes has become urgent.

Transferred-arc and non-transferred-arc plasma generators have been proposed for heating gases, melting materials and treating wastes and are discussed in the March, 1992 issue of INDUSTRIAL HEATING, pp. 64–69, in an article entitled REMOTELY-COUPLED TRANSFERRED-ARC PLASMA FOR MATERIALS PROCESSING AND SYNTHESIS.

The non-transferred-arc plasma torch produces a plasma jet with current between the cathodic electrode and the anodic torch nozzle. Materials being processed by a non-transferred-arc plasma torch process rely upon convective and radiant heat transfer to heat the materials. The material is either injected into the plasma jet or it is contacted by the hot gases associated with the plasma jet.

While the sensible heat in the hot plasma gas can be inefficiently used to melt waste material, the non-transferred-arc torch process only becomes thermally efficient when the level of organic in the material being processed is in excess of 50%. However, for complete and effective combustion of such a material, an oxidizing atmosphere is required and this would cause oxidation of the tungsten electrode used in the process. Thus, the non-transferred-arc torch process can not be operated in the oxidizing atmosphere of air or oxygen required for efficient operation of the process with materials having high organic levels and if the waste material contains little organic, the melting efficiency of the process is poor.

In the true transferred-arc-plasma process the material being treated serves as the anode electrode or the cathode electrode. Similar problems exist whether the melt is an anodic melt or a cathodic melt. Thus, the true transferred-arc-plasma process limits the material being treated to an electrically-conductive material. In addition, conventional transferred-arc plasma melting of ceramic and other materials requires the pre-melting of the materials to produce an electrically-conductive molten phase. This initial processing step adds to the start-up time required to reach a steady operating condition in the melter. Typically, when the material being processed serves as an anodic electrode, the molten bath is either contained in an anodic crucible or anodes are submerged into the bath to provide a return electrical conducting path. While the energy efficiency of this process is better than the non-transferred-arc process, the need for the materials being treated to be electrically conductive limits the materials that can be treated with the process and DC electrolysis at the submerged electrode surface leads to anodic electrode corrosion and contamination of the material produced by the process.

Melters with graphite electrodes have also been used to melt and process materials. However, these melters are limited to materials that can be processed in a reducing atmosphere. Accordingly, this process is not suitable for burning organics for the oxygen required to burn the organics would also consume the graphite electrode.

Cyclone burners have also been used to dispose of or recycle waste materials. However, cyclone burners are not designed to handle molten glass and are used for solid ash waste treatment. For effective combustion using the cyclone burner process, the waste materials should have an organic content in excess of 60–70%. This process also poses a problem if the processed materials are to be utilized in a downstream process as part of a recycling process. With the cyclone burner process, the exit melt-stream temperature is not easily controlled and further processing of the waste materials is thereby complicated.

Arc melters have also been used to dispose of or recycle waste materials. However, poor heat control in the arc causes poor volatilization and/or combustion of the organic in the waste materials as well as rapid erosion of the sidewall and roof refractories. Arc melters usually use graphite electrodes which tend to be consumed quickly and such melters exhibit high radiation heat losses.

SUMMARY OF THE INVENTION

The remotely-coupled, transferred-arc plasma furnace or incinerator and process of the present invention provides an effective and efficient apparatus and method both for melting and/or processing virgin materials and for the recycling, combustion and/or vitrifying incineration of waste materials. The furnace or incinerator, with its high power density, is very versatile. The furnace is small; the throughput is high; the feed stock can be quickly changed; and delivery of the processed materials can be readily controlled to provide the processed materials to downstream manufacturing processes as and when needed.

The present invention, by providing spatial plasma coupling with or without a melt pool, enables the generation of large levels of heat flux in small spatial volumes giving effective heat transfer to the material being processed. Because of this high spatial heat concentration, hydrocarbon volatiles in scrap waste materials are instantaneously flashed to vapor. These hydrocarbons can then be burned either within the melter itself or in an efficient afterburner when extremely high levels of hydrocarbons are present in the waste e.g. rubber. With the present invention, the materials being processed do not have to conform to any minimum or maximum organic content or to any minimum or maximum glass phase requirement. In short, the remotely-coupled, transferred-arc plasma furnace or incinerator of the present invention solves many of the problems associated the conventional cyclone burner processes, the arc melter processes, the non-transferred-arc plasma processes, the true transferred-arc processes and the graphite electrode processes of the prior art.

As mentioned above, the method and apparatus of the present invention can be utilized to effectively and efficiently melt and/or process virgin materials, such as glass and ceramics. In addition to melting and refining these materials, the following are examples of some of the waste materials for which the method and apparatus of the present invention can be utilized.

In the paper industry, there is a need to recover or dispose of chemicals from waste liquors generated during the manufacturing process. The remotely-coupled, transferred-arc plasma furnace and method of the present invention will vaporize the pulp waste liquor at relatively low oxygen potentials to dispose of the chemicals. In addition, the process would produce a high-BTU off-gas with a low sulfur content that could be utilized in the paper manufacturing process.

Oil drilling muds contain both organic and heavy-metal pollutants. Processing these waste materials in the remotely-coupled, transferred-arc furnace would produce a non-leachable glass to effectively seal in the heavy-metal pollutants. The exhaust gases could then be treated with either a plasma or a conventional afterburner for complete combustion and disposal of the organic.

For soils contaminated with heavy metals, the metallic pollutants can be oxidized, by injecting oxygen into the coupling zone between the torches of the remotely-coupled, transferred-arc furnace, and combined with the vitrified soil. An alternative use of the process and apparatus of the present invention, would involve fuming off, oxidizing and collecting the heavy metals separately (as a metal-oxide by-product) from the soil to thereby clean the soil.

There are many non-combustible radioactive waste materials such as salts, oxides and contaminated ceramic components which are costly to bury or otherwise dispose of. Currently, many combustible radioactive wastes are buried without reducing the volume associated with such materials. In both instances, the remotely-coupled, transferred-arc method and furnace of the present invention would be effective to reduce the volume of the waste and to lock the residue in a glass phase suitable for burial.

Conventional incineration methods do not offer sufficiently high temperatures to break down PCB's and other halogen containing organic materials. The plasma arc method and furnace of the present invention effectively destroy such compounds to produce harmless water, carbon dioxide and hydrochloric acid.

Organic materials in scrap fiber products such as, fiberglass, ceramic fibers, mineral wool, etc., can be vaporized leaving a recyclable glass or ceramic material. The exhaust gas from the process in some instances can be used as a fuel for a unit melter or to provide heat for a building. Where the exhaust gases are discharged to the atmosphere, they frequently do not need further treatment or need only be scrubbed and/or passed through an afterburner. Examples of organic materials which can be vaporized to remove them from scrap fiber are: phenolic binders, furan binders, fiber-reinforcing sizings, lamp black in duct liner products, facing materials, organic coating materials, foam backings and other organic materials.

By utilizing the plasma system of the present invention as a fiber glass scrap melter, glass cullet can be produced from fiber glass scrap effecting a savings in glass batch costs and providing a premium remelt material to the glass melter. The instantaneous burning off of the organic binders in the scrap fiber produces a cullet with a low carbon content that makes the cullet highly suitable as a feed stock for a conventional glass melter. The redox potential of the glass cullet may also be adjusted with the process as desired. The melt stream from the plasma melter of the present invention can also be transferred directly to a marble machine, rotary fiberizer, primary bushing or other product forming station to make glass products directly from the melt of the plasma melter.

In the present invention, a plasma arc melter or incinerator is equipped with at least two transferred-arc plasma torches of opposite polarities. One of the torches is a cathode torch comprising a cathode electrode and a nozzle for emitting a cathode plasma jet. Another of the torches is an anode torch comprising an anode electrode and a nozzle for emitting an anode plasma jet. Current is transferred between the torches through a coupling zone to melt, burn or incinerate materials within the melter.

The current can be transferred between the torches via three different modes. The first coupling mode is the jet coupling mode wherein the torches, with plasma jets of opposite polarity, are in close proximity to each other and the current is transferred directly from one jet to the other jet. The second coupling mode is the melt coupling mode wherein the torches are separated such that the current is transferred from one jet to the other jet by passing through an intermediate electrical conductor such as a melt pool or some other electrically conductive material. The third coupling mode is a combination of the first two modes. While the third coupling mode is somewhat unstable, the torches have operated in a position where the coupling path vacillates between a direct current transfer between the jets and an indirect transfer through a melt pool or some other electrically conductive material being processed.

In the process of the present invention, a melter shell holds the materials being melted and/or processed. The melter shell is generally cylindrical in shape, open at the top and provided with a centrally located outlet in its bottom for removing processed materials from the melter. The outlet orifice is preferably made of molybdenum but can be made from other refractory materials. The torches are mounted in a generally conically shaped hood which encloses the open top of the melter shell. The base of the hood is larger in diameter than the melter shell to permit oxidizing air to enter into the melter between the melter shell and the hood. While the process could operate as a batch process, the melter shell and the hood are normally rotated relative to each other during operation of the melter to increase mixing. The melter shell and the hood can be moved vertically relative to each other to adjust the amount of air being introduced into the melter and/or the position of the torches relative to the melt pool. The materials being processed and/or melted are introduced into the melter through a feed port in the hood which is offset with respect to the longitudinal axis of the melter shell. The trajectory of the materials being fed into the melter through the feed port can be changed to adjust the residence time of the materials in the melter.

The cathode torch used in the process of the present invention has a thoriated-tungsten, water-cooled, pointed electrode which serves as the cathode electrode. A water cooled copper nozzle provides a shroud of plasma gas around the cathode electrode, confines the arc attachment to the cathode electrode and serves as an electrode for high-frequency plasma initiation.

In one embodiment of the present invention, the anode torch is similar in construction to the cathode torch, but, instead of the thoriated-tungsten, pointed electrode, the anode torch has a high purity copper, water-cooled, button electrode which dissipates the heat generated by electrons "condensing" on the anode surface. This button electrode anode torch works well for material processing mass flow rates at or below 500 pounds per hour. However, at higher material processing rates, the button electrode anode torch suffers severe copper electrode erosion. This erosion leads to a shortened torch life which affects process economics and operating efficiencies. Accordingly, there is a second embodiment of the anode torch which has a high purity copper, water-cooled, tubular electrode that can operate at material processing rates above 500 pounds per hour without the severe erosion problems experienced with the button electrode anode torch.

In the operation of the process of the present invention with the button electrode anode torch, the discharge end of the anode torch nozzle is normally located farther above the surface of the materials in the melter shell than the discharge end of the cathode torch nozzle. This relative placement of the anode torch and the cathode torch is due to the relative strengths of the cathode plasma jet and the anode plasma jet. Normally, the cathode plasma jet produced by the cathode torch has a higher strength than the anode plasma jet produced by the button electrode anode torch. Accordingly, if the nozzles of the torches are relatively close together and directed generally toward each other at an angle, the stronger or higher energy cathode plasma jet will bend the anode plasma jet backward. In this instance, if the discharge ends of the cathode torch and the anode torch are at the same level, the cathode plasma jet can bend the anode plasma jet into contact with the nozzle of the anode torch. This can result in a nozzle short which damages the nozzle and can cause a shutdown of the process. If the nozzles of the torches are directed parallel to each other and at the surface of the melt being processed, the need to offset the anode nozzle above the cathode nozzle is lessened.

The plasma jet produced by the tubular electrode anode torch is stronger or has greater energy than the plasma jet produced by the button electrode anode torch. Accordingly, if the tubular electrode anode torch is used instead of the button electrode anode torch, the discharge end of the anode torch can frequently be at the same level as the discharge end of the cathode torch.

Operating the system requires a high-frequency controlled discharge between the electrode and the nozzle on both the anode torch and the cathode torch. This action generates an intermediate non-transferred arc plasma at each torch. For the cathode torch, current flows from the cathodic electrode to the nozzle. For the anode torch, current flows from the nozzle to the anodic electrode. Like conventional transferred-arc systems, a biasing resistor is used to produce the secondary initiation from the non-transferred to the transferred mode of operation.

In the transferred mode, the cathode plasma jet and the anode plasma jet are coupled together in the coupling zone with the current being transferred directly between the plasma jets and with the materials in the melter shell being melted by convection of the hot plasma gases from the plasma jets and radiated heat from the plasma jets or with the current flowing through the materials in the melter shell.

To initiate the plasma in the melter shell, the anode and cathode torches are first operated in the non-transferred mode and then switched to the transferred mode with the current flowing directly between the plasma jets to heat the materials in the melter shell by convection and radiation. The discharge end of the cathode torch nozzle is located approximately on the longitudinal axis of the melter shell and directed at the melter outlet in the bottom of the shell. The discharge end of the anode torch nozzle is offset with respect to the longitudinal axis of the melter shell and directed at the melter shell outlet in the bottom of the melter shell.

After a portion of the materials in the melter shell has melted and formed a pool of molten material, the current from the cathode torch to the anode torch is passed through the melted material within the melter shell. The discharge end of the cathode torch nozzle is moved outward to a location offset with respect to the longitudinal axis of the melter shell and the discharge end of the anode torch nozzle is moved inward to a location approximately on the longitudinal axis of the melter shell. Additional materials to be melted are introduced into the melter, at a location offset with respect to the longitudinal axis of the melter shell, through the feed port in the hood. The melter shell and the hood are rotated relative to each other such that the materials being fed into the melter through the feed port pass beneath the discharge end of the cathode torch nozzle before these materials pass beneath the discharge end of the anode torch nozzle.

During the process, the current continues to be transferred between the cathode plasma jet and the anode plasma jet by passing through the materials being melted which are in the coupling zone. The passage of the current through the materials causes the materials to be melted by ohmic-heat generation.

An oxidizing gas, such as air, oxygen or steam, can be introduced into the coupling zone for greater combustion efficiency or to change the redox potential of the melt. The oxidizing gas can be introduced into the coupling zone by being injected into the space between the torches from a centrally located injection tube above the torches; injection tubes extending along the underside of the torches; or through shrouds on the cathode and anode plasma torches. When using the apparatus and method of the present invention with waste materials having a very high organic content, a plasma arc or conventional afterburner can be used to further treat the exhaust gases from the melter.

As discussed above, while the button electrode anode torch can be used for processing rates below 500 pounds per hour, for processing rates above 500 pounds per hour, the tubular electrode anode torch design is preferred. The cathode torch remains unchanged and can be used with either the button electrode anode torch or the tubular electrode anode torch. The anode torch with the tubular copper electrode has a greater arc stability than the copper button electrode and should therefor provide longer torch service life. The high gas flow rates associated with this torch design rotate the arc and the arc attachment point about the inner cylindrical surface of the tubular copper electrode. The constant arc movement leads to lower erosion rates than those experienced with the copper button electrodes. In addition, since air can be used rather than the argon gas used with the copper button electrode, greater combustion power for incinerating organic scrap can be attained by using the anode torch with the tubular copper electrode.

DESCRIPTION OF THE DRAWINGS

FIG. 5 is a schematic view, in elevation, illustrating the positioning of the plasma arc torches during plasma initiation.

FIG. 6 is a schematic view, in elevation, illustrating the positioning of the plasma arc torches as the melting of the material being processed is initiated and the orifice is being opened.

FIG. 7 is a schematic view, in elevation, illustrating the positioning of the plasma arc torches during normal operation.

FIG. 8 is a schematic view, in plan along line 8—8 of FIG. 7, illustrating the positioning of the plasma arc torches during normal operation.

DESCRIPTION OF THE PREFERRED EMBODIMENTS

Figure 1:
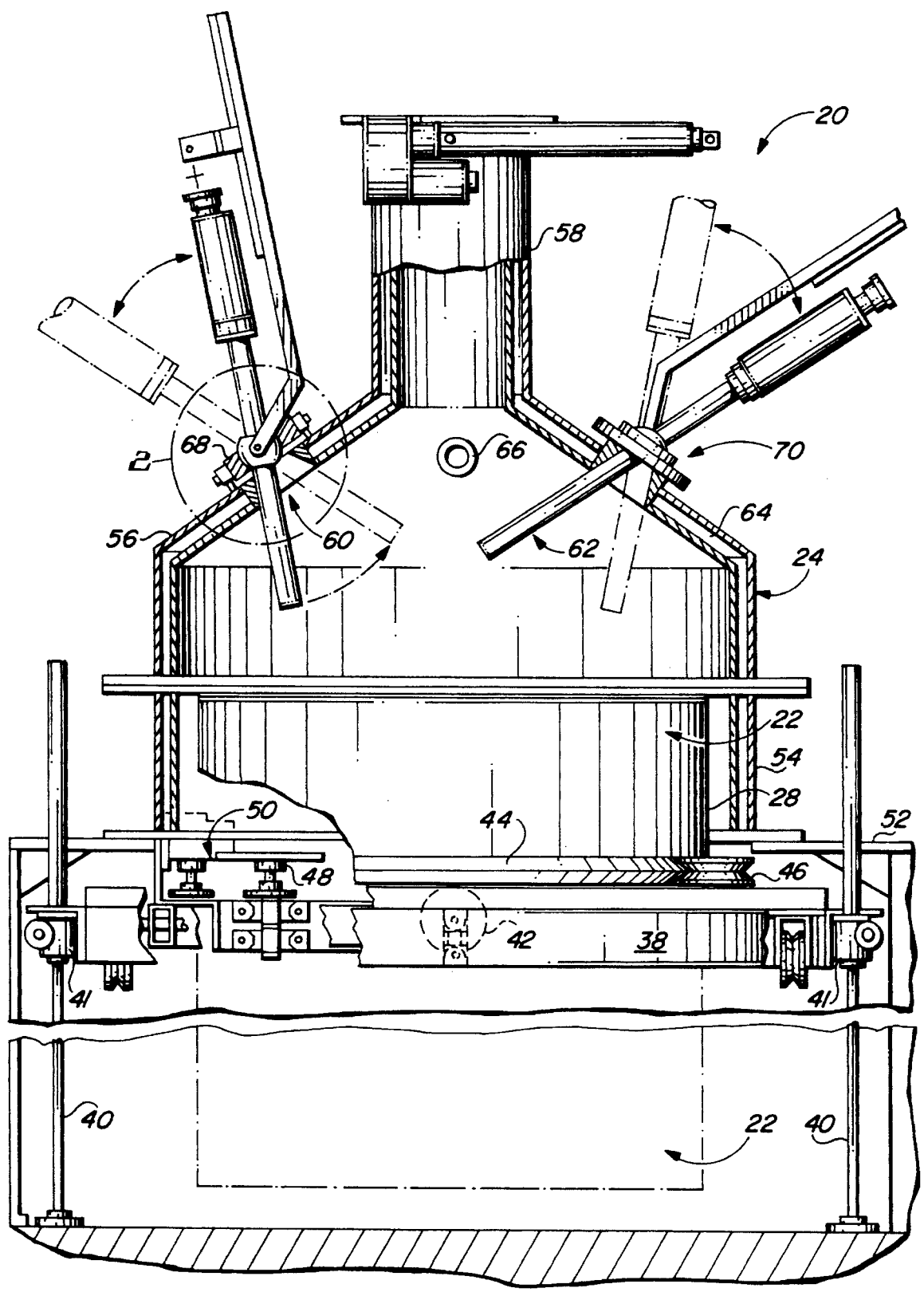
FIG. 1 is an elevation, in section, of the plasma arc furnace of the present invention with the melter shell in its raised operating position and, in phantom line, in its lowered non-operating position.
Figure 2:
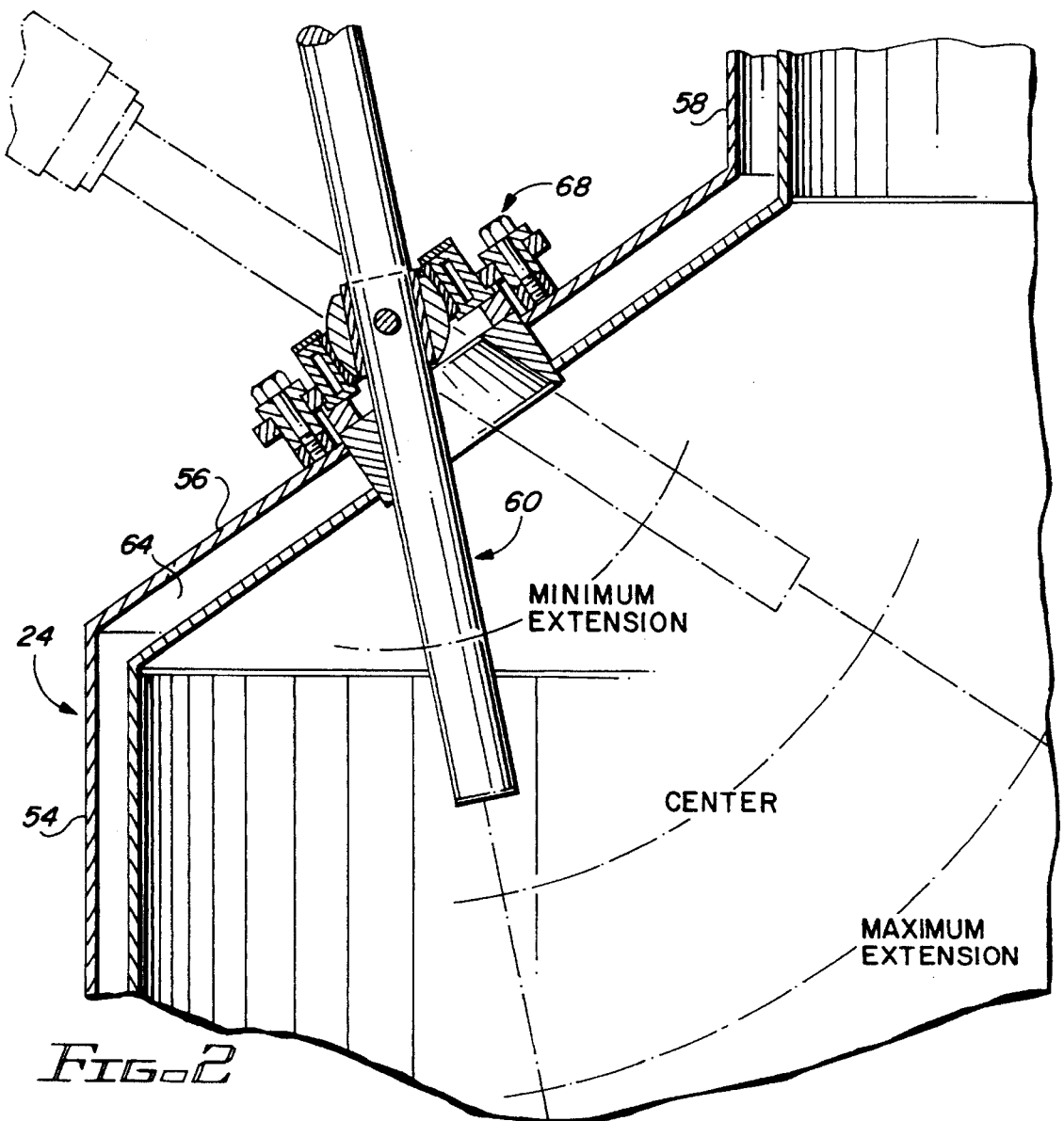
FIG. 2 is a detailed view of a portion of the plasma arc furnace of FIG. 1 showing the mounting for the cathode torch and the range of movement of the cathode torch (the mounting for the anode torch is identical).

FIG. 1 shows the improved plasma arc furnace 20 of the present invention with the melter shell 22 in a raised position within the melter hood 24 and, in phantom line, in a lowered position non-operating position where the melter shell 22 can be moved out from under the melter hood 24 for maintenance of the furnace.

As shown in FIGS. 5–7, the melter shell 22 is cylindrical in shape and made of low carbon steel with a bottom wall 26, a side wall 28 and an open top. The bottom wall is provided with a molybdenum outlet orifice assembly 30 which is cylindrical in shape, open at the bottom and closed at the top except for the outlet orifice 32. The outlet orifice assembly 30 is located on the longitudinal axis of the melter shell 22 with the longitudinal axis of the melter shell passing through the outlet orifice 32.

With this construction, the outlet orifice 32 of the outlet orifice assembly 30 is raised above the bottom wall 26 of the melter shell. Thus, a thicker layer 34 of unmelted skull can be used in the plasma arc furnace 20, than in the previous furnace with the conical melter shell design, to increase the distance between the melt pool 36 and the melter shell walls 26 and 28 to thereby reduce the heat losses through the walls of the melter shell 22. Melted materials from the melt pool 36 in the melter shell 22 of the plasma arc furnace 20 are removed from the furnace for disposal or further processing through the outlet orifice 32. As shown in FIG. 1, the melter shell 22 is mounted on a frame 38 which is supported by four legs 40 which are used as the rack gears of rack and pinion gear assemblies 41 to raise and lower the melter shell relative to the melter hood 24 by means of a DC motor. With this construction the vertical position of the melter shell 22 relative to the melter hood 24 can be adjusted for the processing of different materials within the plasma arc furnace and the melter shell can be lowered beneath the melter hood so that it can be removed for maintenance of the furnace.

The melter shell support frame 38 has a plurality of support rollers 42 mounted thereon which engage the underside of the bottom wall 26 of the melter shell to support the melter shell and permit the melter shell to rotate relative to the support frame 38 and the melter hood 24.

The melter shell 22 has an annular drive rail 44 encircling its sidewall 28 adjacent the bottom the melter shell. This drive rail 44 is engaged by guide rolls 46 and drive roll 48 for rotating the melter shell 22 relative to the melter hood 24. The drive roll 48 is driven by a conventional DC motor and control system 50 for regulating the rotation of the melter shell 22 relative to the melter hood 24. Other methods of rotating the shell 22 can also be used, such as, the use of a large gear affixed to the bottom of the shell and driven by DC motor through a conventional chain drive.

The melter hood 24 is made of low carbon or stainless steel and is mounted on a stationary frame 52. As best shown in FIG. 1, the melter hood 24 comprises a cylindrical base section 54 (which can be expandable in length), a conical midsection 56 and a cylindrical exhaust stack 58. The cathode torch 60 and the anode torch 62 are mounted in the conical midsection 56.

The inside diameter of the cylindrical base section 54 of the melter hood 24 is greater than the outside diameter of the melter shell 22. This creates a gap between the melter hood 24 and the melter shell 22 which, through natural convection, allows the ingression of air into the plasma arc furnace 20 to provide oxygen for better and more complete combustion of the organic materials associated with the waste materials when waste materials are being processed. By raising or lowering the melter shell 22 relative to the melter hood 24 the amount of air entering the plasma arc furnace 20 can be controlled and the height of the torches above the melt can be adjusted. With the use of an exhaust fan, not shown, the combustion air introduced into the furnace 20 through the gap between the melter shell 22 and the melter hood 24 can be even more closely controlled.

The conical midsection 56 of the melter hood is tapered at an angle to facilitate the flow of off-gases from the plasma arc furnace and to eliminate any stagnant area where off-gases could gather. The entire melter shell 24 is provided with a water cooled jacket 64 to maintain the temperature of the melter hood within an acceptable range and to condense volatile inorganic on the hood to form an insulating layer that retards the heat loss through the hood.

A feed port tube 66 for introducing the materials to be processed into the plasma arc furnace 20 is provided in the conical midsection 56 of the melter hood 24. The feed port tube 66 is offset with respect to the longitudinal axis of the melter shell 22 so that, as shown in FIG. 8, materials to be processed in the furnace are introduced into the melter shell at a location offset from the longitudinal axis of the melter shell 22. The feed port tube 66 is mounted in a spherical bearing so that the angle that the material to be processed is fed into the melter shell can be adjusted to control the residence time of the material in the melter shell 22. By depositing the material closer to the vertical centerline of the melter shell, the residence time and processing time for the material is reduced. By depositing the material closer to the sidewall of the melter shell 22, the residence or processing time for the material in the melter is increased.

The cathode torch 60 and the anode torch 62 are each mounted in spherical bearings 68 and 70 respectively to permit the angle of the torches relative to each other and the outlet orifice assembly 30 to be adjusted. The torches 60 and 62 can also be inserted or retracted in directions parallel to their longitudinal axes so that the location of the torches relative to the longitudinal axis of the melter shell 22 can be adjusted for proper operation of the plasma arc furnace as will be more fully explained below.

As shown in FIGS. 5–7, for even greater oxidation potential of any waste materials being processed, a water-cooled tube 72 is provided for injecting air, oxygen or steam into the plasma arc furnace 20. The water-cooled tube 72 extends down through the exhaust stack 58 and is located along the longitudinal axis of the melter shell 22. With the water-cooled tube 72 air, oxygen or steam can be injected directly into the low-pressure coupling zone between the plasma jets. The resulting oxygen enriched plasma provides greater combustion efficiency and can be used to control the redox potential of a glass melt in the furnace.

Figures 3, 4:
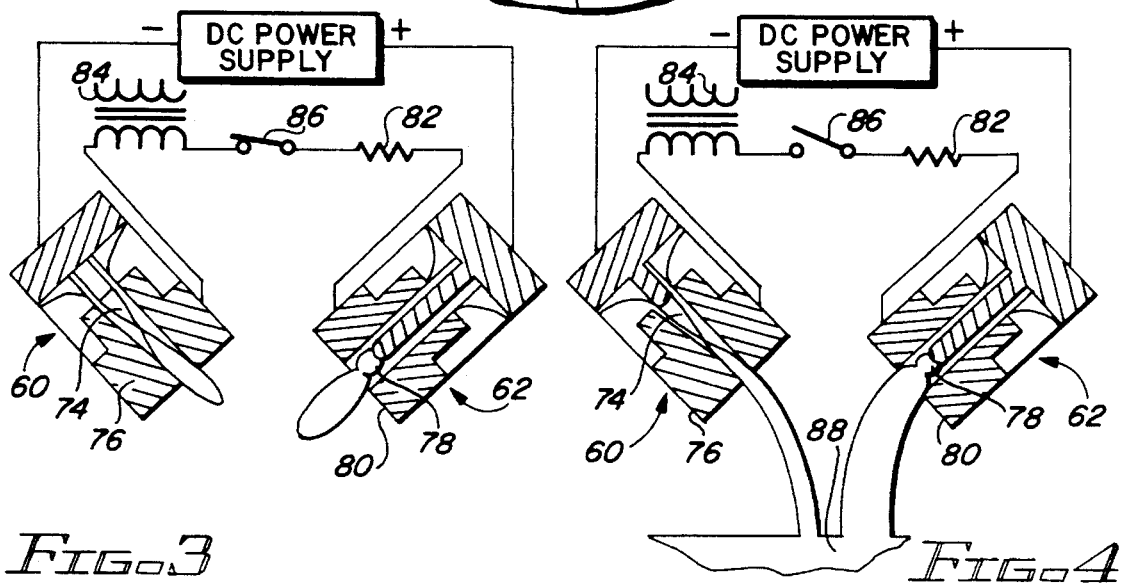
FIG. 3 is a schematic view of the remotely-coupled plasma torches of the present invention operating in the non-transferred arc mode for plasma ignition.
FIG. 4 is a schematic view of the remotely-coupled plasma torches of the present invention operating in the transferred arc mode for normal operation.

FIGS. 3 and 4 show the remotely-coupled plasma torches 60 and 62 of the present invention operating in the non-transferred-arc mode for plasma ignition and the transferred-arc mode for normal operation respectively. Conventional transferred-arc plasma melting of ceramic and other materials requires pre-melting of the materials to produce an electrically conductive molten phase. This initial processing step adds to the start-up time required to reach a steady operating melter. Typically, the molten bath is either contained in an anodic crucible or anodes are submerged into the bath, thereby providing a return electrical conduction path. During processing of the materials, the direct current which flows through the system can cause undesirable electrolytic reactions at the anode surface which can lead to anode corrosion and contamination of the molten material.

To eliminate these and other shortcomings of conventional transferred-arc plasma melters, the transferred-arc system of the present invention was developed which comprises two plasma torches 60 and 62 of opposite polarity. The cathode torch 60 consists of a thoriated-tungsten, water cooled, pointed electrode 74 which serves as the cathode electrode. A water cooled copper nozzle 76 provides a shroud of plasma gas around the cathode electrode 74, confines the arc attachment to the cathode electrode 74 and serves as an electrode for high-frequency plasma initiation. To provide the cathodic plasma jet with the required melt penetration required for processing waste materials, the plasma gas supplied to the cathode torch 60 during normal operation is nitrogen. However, where nitrogen oxide emissions may be a problem, a blend of argon and helium gas can be used with the helium having the same effect of strengthening the cathode plasma jet as the nitrogen.

For processing mass flow rates up to 500 pounds per hour, the anode torch consists of a high-purity copper, water-cooled, electrode button 78 which dissipates the heat generated by electrons "condensing" on the anode surface. A water cooled copper nozzle 80 provides a shroud of plasma gas (normally argon) around the anode electrode 78, confines the arc attachment to the anode electrode 78 and serves as an electrode for the high-frequency plasma initiation. This type of anode torch is shown in greater detail in FIG. 9. For processing mass flow rates over 500 pounds per hour, the anode torch of FIG. 12 with its tubular copper electrode is preferred due to its lower electrode erosion rates and its ability to use air as the plasma gas. Except for the use of air rather than argon gas as the plasma gas, the operation of the anode torch with the tubular copper electrode is the same as the operation described in the next succeeding paragraph for the anode torch with the copper button electrode.

Operation of the remotely-coupled transferred-arc plasma melting system requires a high-frequency controlled discharge between the electrodes 74 and 78 and the nozzles 76 and 80 on both the cathode and anode torches. This action generates an intermediate non-transferred-arc plasma at each torch as shown in FIG. 3. For the cathode torch 60, current flows from the cathodic electrode 74 to the nozzle 76. For the anode torch 62, current flows from the nozzle 80 to the anodic electrode 78. Like the conventional transferred-arc plasma melting systems, a biasing resistor 82 is used to produce the secondary initiation from the non-transferred to the transferred mode wherein the current now passes between the cathodic electrode and the anodic electrode without passing through the nozzles 76 and 80, the high frequency start transformer 84, the non-transferred contact switch 86 and the biasing resistor 82. As shown in FIG. 4, with the non-transferred contact switch 86 open, two transferred-arc plasma jets of opposite polarity are generated which impinge in a region located between the torches 60 and 62. In this remote location, termed the coupling zone 88, current can either be transferred directly through the plasma phase, where the plasma jets are coupled directly together as in the initiation of a material treating or melting process, or through an external conductor, such as the material being treated or melted, which material is introduced between the two plasma jets.

With the remotely-coupled, transferred-arc system of the present invention power densities of 111 kw/sq ft have been obtained. However, in normal operation power densities of 106 kw/sq ft are anticipated. The reaction temperatures within the plasma jets are between 5,000 and 15,000 degrees K.

Figure 9:
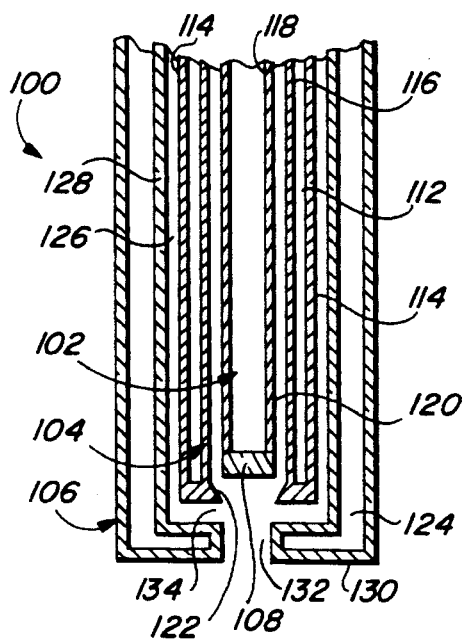
FIG. 9 is a longitudinal, sectional view of an anode plasma torch of the present invention with a copper button electrode and a water cooled torch shroud for introducing pressurized air, oxygen or steam into the coupling zone.

FIGS. 5, 6, 7 and 8 show the plasma arc furnace of the present invention (using a button electrode anode torch, such as, the anode torch 100 of FIG. 9) during the plasma initiation phase; the melt initiation and orifice opening phase; and the normal operating phase of the process. As shown in FIG. 5, once the operation of the cathode plasma torch 60 and the anode plasma torch 62 (with the copper electrode button) is switched from the non-transferred to the transferred mode of operation during the plasma initiation phase of the process, the plasma jets 94 and 96, using argon gas, impinge in the region between the torches (the coupling zone 88) with the current being transferred between the torches directly through the plasma phase. As shown, the material in the melter shell 22 is unmelted, the lower ends of the torch nozzles 76 and 80 are about 2 inches apart, each nozzle is inclined at an angle of about 45 degrees to the vertical, and each nozzle is about 10 inches above the surface of the cold melt. While unmelted, the materials in the melter are starting to be heated by the convection of hot plasma gases from the plasma jets and the radiated heat from the plasma jets.

In the melt initiation and orifice opening phase of the process shown in FIG. 6, the plasma gas for the cathode torch 60 is changed to nitrogen. This stiffens or stabilizes the jet and gives the cathode jet 94 greater strength. At the same time that the plasma gas for the cathode torch is switched to nitrogen to strengthen the jet, the torches are lowered closer to the surface of the material to be melted with the discharge end 90 of the anode torch nozzle 80 being located farther above the upper surface of the melt pool 36 than the discharge end 92 of the cathode torch nozzle 60. In a furnace with a melter shell having a diameter of about three feet and a capacity of about 1500 pounds/hour, it has been found that the discharge end 90 of the anode torch nozzle 80 should be about 3–4 inches above the discharge end 92 of the cathode torch nozzle after the cathode torch plasma gas has been switched to nitrogen. If the discharge end 90 of the button electrode anode torch nozzle is not maintained at a level above the discharge end 92 of the cathode torch nozzle, the anode torch will eventually fail due to arc attachment of the anode jet to the edge of the anode torch nozzle 80.

As shown in FIG. 6, to initiate the melting or processing of materials in the melter shell 22, the discharge end 92 of the cathode torch nozzle 76 is located approximately on the longitudinal axis of the melter shell, inclined at an angle as close to the vertical as practical and aimed directly at the outlet orifice 32 of the outlet orifice assembly 30. The discharge end 90 of the anode torch nozzle 80, in a furnace approximately three feet in diameter, is located 2–3 inches off the longitudinal axis of the melter shell 22; is inclined at an angle of about 45 degrees to the vertical and is also aimed directly at the outlet orifice 32 of the outlet orifice assembly 30.

The current is now transferred between the cathode plasma jet 94 and the anode plasma jet 96 by passing through the melt pool 36 which is now in the coupling zone 88. The passage of the current through the materials in the melt pool 36 causes the materials to be heated by ohmic-heat generation.

As shown in FIGS. 7 and 8, in the normal operating phase of the process, the discharge end 92 of the cathode torch nozzle 76 is moved radially outward about 2–3 inches to a location offset with respect to the longitudinal axis of the melter shell 22 and the discharge end 90 of the anode torch nozzle 80 is moved radially inward about 2–3 inches to a location approximately on the longitudinal axis of the melter shell 22. The discharge end of the anode torch nozzle continues to be positioned about 3–4 inches above the discharge end of the cathode torch nozzle and continues to be aimed at the outlet orifice 32 of the outlet orifice assembly 30 so that the jet contacts the melt pool 36 on the centerline of the melt above the outlet orifice.

The angle of inclination of the cathode torch 60 to the vertical is varied to adjust the diameter of the melt pool for temperature control. For the same power input, the farther out from the centerline of the melter shell 22 that the cathode plasma jet 94 contacts the melt pool the larger the volume of the melt pool 36 and the lower the temperature of the melt pool. Thus, by varying the location at which the cathode jet contacts the material being processed in the melter shell 22, the operating temperature of the process can be adjusted.

Additional materials to be melted or processed are introduced into the plasma arc furnace 20 through the feed port tube 66. For scrap material to be treated in the plasma arc furnace 20, it must first be pre-processed to form a suitable feed stock. For example, fiber glass scrap can be guillotined, roll milled, granulated, hammer milled or chopped to provide small fiber clumps. The pre-processed material is then screw fed to the plasma arc furnace 20 through a feed tube (not shown), using a slightly positive air pressure to prevent the bridging of the material in the feed tube, and introduced into the plasma arc furnace 20 through the feed port tube 66.

As discussed above, the feed port tube 66 is offset with respect to the longitudinal axis of the melter shell 22 thereby causing materials added to the furnace 20 to be introduced into the melt pool at a location radially offset from the longitudinal axis of the melter shell 22 and at a location outside of the coupling zone 88. In addition to affecting the residence time of the material being processed in the furnace, by feeding the feed stock into the melter shell 22 at a location radially offset from the longitudinal axis of the melter shell, a solid side wall layer 34 of feed stock is assured which does not melt down and insulates the sidewall 28 of the melter shell. The surface diameter of the melt pool 36 is largely governed by the feed rate of feed stock into the melter shell, the radial location of the feed port tube 66 and the position of the cathode torch. The introduction of the feed stock at a location radially offset from the longitudinal axis of the melter shell enables a "scummy" layer 98 of melt to exist on the surface of the melt pool 36. This scummy layer 98 of melt effectively reduces radiation heat loses from the surface of the melt pool 36.

As shown in FIG. 7, the vertical profile of the melt pool 36 is oblong in shape. The region of highest temperature is located at the same radius as the discharge end 92 of the cathode torch 60. During normal operation, the melter shell, as viewed from above in FIG. 8, is rotated in a counter-clockwise direction at a rate of between 3 and 30 revolutions per minute (preferably about 6 revolutions per minute). This causes the newly added material to pass beneath the discharge end 92 of the cathode torch 60 before the material passes beneath the discharge end 90 of the anode torch 62.

The cathode torch 60 produces a plasma jet 94 which has a greater intensity than the plasma jet 96 produced by the anode torch 62. Thus, the plasma jet 94 of the cathode torch 60 can penetrate the unmelted batch introduced into the furnace 20 through the feed port tube 66 and initiate the melting of the newly introduced batch. Once heated by the plasma jet 94 of the cathode torch 60, the partially melted batch passes under the plasma jet 96 of the anode torch 62. Since the batch has been partially melted before it reaches the plasma jet 96 of the anode torch, no instability of the less intense anode torch plasma jet 96 is experienced. If the rotation of the melter shell 22 were reversed to cause the newly added batch to pass beneath the plasma jet 96 of the anode torch before passing beneath the plasma jet 94 of the cathode torch, it could cause instability of the anode torch and failure of the anode torch.

Figure 10:
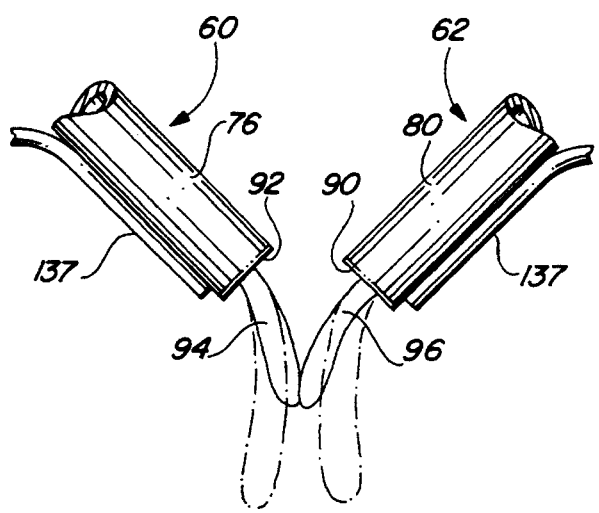
FIG. 10 is a detailed view of the anode and cathode torches of the present invention provided with air, oxygen or steam tubes for introducing pressurized air, oxygen or steam into the coupling zone.

Air, oxygen or steam, at pressures of about 40 pound per square inch, can be injected directly into the low-pressure zone 99 between the plasma jets through the water cooled injection tube 72 shown in FIGS. 5–7; through the use of the shroud covered plasma torch 100 of the present invention shown in FIG. 8 or through the injection tubes 137 mounted on the underside of the plasma torches of the present invention as shown in FIG. 10. The injection of air, oxygen or steam (oxidizing gases) between the plasma jets maintains a stream of metastable oxygen ions (both cations and anions) in the plasma gas and the incineration of hydrocarbons is both rapid and efficient because of the rapid oxidation effect of the energetic oxygen ions. Thus, the additional oxygen provided in the area between the plasma jets 94 and 96 provides greater combustion efficiency, for a more complete combustion of organic in the material being processed, and can be used to control the redox potential of a glass melt when the furnace is being used with glass materials.

FIG. 9 shows a longitudinal, sectional view of a plasma torch 100 of the present invention. The torch shown is an anode torch like the anode torch 62 of FIGS. 3 and 4 and consists of a cylindrical electrode element 102, a plasma torch nozzle 104 and a plasma torch shroud 106. The electrode element is made of copper and has a high-purity copper button tip 108. In a cathode torch like the cathode torch of FIGS. 3 and 4, the copper button tip 108 is replaced by a thoriated-tungsten conical tip. The electrode element 102 and its tip 108 are mounted within the nozzle sleeve 104. The nozzle sleeve 104 is a double walled cylindrical tube with a cooling chamber 112 formed by the walls 114 and 116 through which water passes to cool the nozzle. The nozzle also has a tubular channel 120 defined by tubular walls 116 and 118 through which plasma gas is introduced under pressure into the plasma torch 100. The nozzle extends beyond the end of the electrode element tip 108 and the tubular channel 120 is provided with an annular discharge opening 122 that introduces gases from the tubular channel 120 into the region of the electrode tip 108 to form the plasma jet.

The plasma torch nozzle 104 is mounted within the tubular shroud 106. The shroud is made of stainless steel or copper, provided with a tubular cooling chamber 124 through which water is passed to cool the shroud and other components of the torch. A tubular channel 126 is formed between the inner wall 128 of the shroud and the outer wall 114 of the torch nozzle 104. The shroud 106 extends beyond the end of the nozzle 104 and has an annular section 130 of reduced diameter to form a discharge opening 132 for the torch. The pressurized gas introduced through the tubular channel 126 is introduced into the discharge opening 132 of the torch through an annular opening 134 adjacent and downstream of the discharge opening 122 of the plasma torch nozzle 104. Various gases can be introduced into the process through the plasma torch nozzle and the plasma torch shroud to meet the requirements of the particular process.

FIG. 10 shows an improved plasma torch system of the present invention wherein the cathode torch 60 and the anode torch 62 are each provided with an air, oxygen or steam injection tube 137. The tubes 137 extend along the underside of and are welded to the cathode and anode electrode nozzles 76 and 80 respectively. When air, oxygen or steam is injected into the plasma jets 94 and 96 from the injection tubes 137, the plasma jets are straightened from the orientations shown in FIG. 10 in phantom line to the orientations shown in FIG. 10 in solid line. This increases the torch performance of both torches by providing oxygen to promote combustion and by deflecting the plasma jets 94 and 96 away from the ends of the torch nozzles 76 and 80.

As discussed above, contact between the plasma jets 94 and 96 and the ends of the torch nozzles can cause short circuiting through the nozzles damaging the nozzles and possibly shutting down the process. Since the cathode plasma jet 94 is stronger than the anode plasma jet 96 during normal operation, the pressure of the air, oxygen or steam exiting the injection tube on the underside of the anode plasma torch 62 may have to be greater than the pressure of the air, oxygen or steam exiting the injection tube on the underside of cathode plasma torch 60 to keep the plasma jet of the anode torch from coming in contact with the end of the anode torch nozzle. With the discharge end 90 of the anode torch nozzle positioned above the discharge end 92 of the cathode torch nozzle during operation of the furnace or incinerator, as discussed above, the need to have the air, oxygen or steam exiting the injection tube on the underside of the anode torch 62 at a higher pressure is lessened or eliminated. However, should the discharge ends of the cathode and anode nozzles be located at about the same level above the melt, the need to have the pressurized air, oxygen or steam exiting the injection tube 137 on the underside of the anode torch 62 at a higher pressure than the air, oxygen or steam exiting the injection tube 137 on the underside of the cathode torch 60 is greater if contact between the anode torch plasma jet 96 and the end of the anode torch nozzle is to be prevented.

Figure 12:
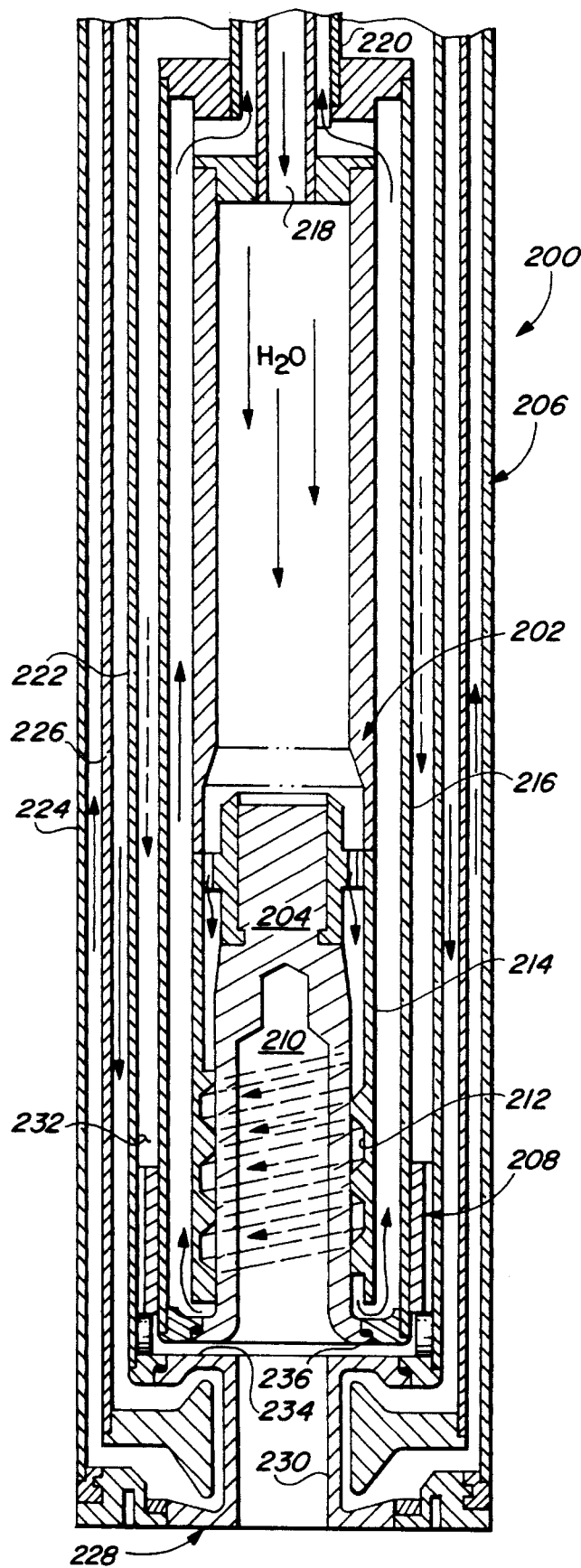
FIG. 12 is a longitudinal, sectional view of a second anode plasma torch of the present invention with a copper tubular electrode and a water cooled torch shroud and nozzle assembly.
Figure 14:
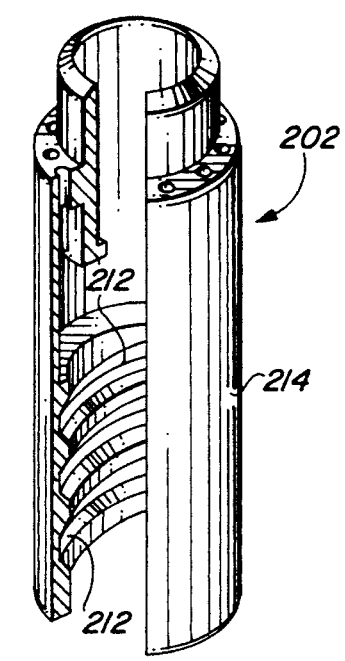
FIG. 14 is a three quarter view of the electrode housing used in the anode torch of FIG. 12.

FIG. 12 is a longitudinal, sectional view of a second embodiment 200 of the anode torch used in the apparatus of the present invention. The tubular electrode anode torch 200 is preferred over the button electrode anode torch 100 for material processing rates of 500 pounds per hour or greater. The anode torch 200 comprises a tubular, water cooled electrode housing 202; a tubular electrode 204 housed within the electrode housing 202; a tubular, water cooled shroud and nozzle assembly 206 housing the electrode housing 202 and an air supply channeling collar 208 intermediate the shroud and nozzle assembly 206 and the electrode housing 202.

The tubular electrode 204 is closed at one end and has an inner cylindrical surface 210 and an outer cylindrical surface 212. The electrode is preferably made of a high-purity copper. The electrode housing is made of stainless steel or copper and has an inner tubular wall 214 and an outer tubular wall 216. Cooling water is introduced into the electrode housing 202 through an inlet tube 218 and is discharged from the electrode housing through outlet sleeve 220. After being introduced into the electrode housing through the inlet tube 218, the cooling water passes between the outer cylindrical surface 212 of the tubular electrode 204 and the inner tubular wall 214 of the electrode housing to cool the tubular electrode 204. The cooling water then passes back between the inner tubular wall 214 and the outer tubular wall 216 of the electrode housing and out through the outlet sleeve 220.

The shroud and nozzle assembly 206 is made of stainless steel or copper. The shroud and nozzle assembly comprises an inner tubular wall 222, an outer tubular wall 224, and an intermediate tubular wall 226. Cooling water is circulated through the shroud and nozzle assembly 206 by passing the cooling water in through the sleeve formed by the inner tubular wall 222 and the intermediate tubular wall 226 and out through the sleeve formed by the intermediate tubular wall 226 and the outer tubular wall 224. The nozzle portion 228 of the shroud and nozzle assembly 206 has an inner cylindrical surface 230 that defines the throat of the nozzle. The diameter of the throat formed by the cylindrical inner surface 230 is substantially equal to the diameter of the inner cylindrical surface 210 of the tubular electrode 204.

Figure 13:
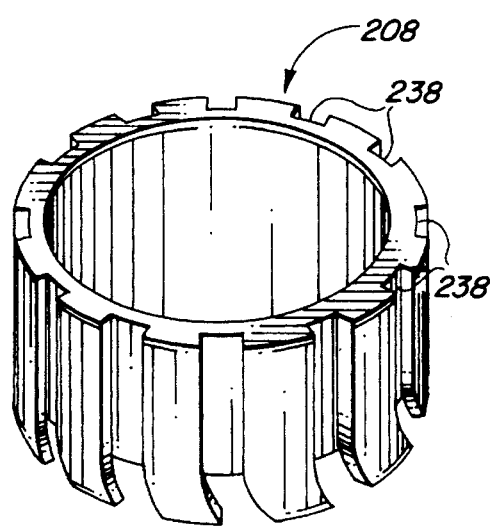
FIG. 13 is a perspective view of the plasma gas channeling collar used in the anode torch of FIG. 12.

The pressurized oxidizing gas, preferably air, for the plasma jet formed by the torch 200 is introduced into the torch by passing the gas in through a tubular channel 232 formed between the outer tubular wall 216 of the electrode housing and the inner tubular wall 222 of the shroud and nozzle assembly. An inner annular surface 234 of the nozzle portion 228 of the shroud and nozzle assembly 206 is spaced from an annular surface 236 of the tubular electrode 204. These two surfaces form an annular inlet for introducing the pressurized gas of the plasma jet from the tubular channel 232 into the interior of the electrode 204 and the throat of the nozzle portion 228 of the shroud and nozzle assembly. As the oxidizing gas exits the tubular channel 232, the oxidizing gas passes through the channeling collar 208 located intermediate the outer tubular wall 216 of the electrode housing 202 and the inner tubular wall 222 of the shroud and nozzle assembly. As best shown in FIG. 13, the channeling collar 208 has a plurality of spiral channels 238 in its outer surface which cause the oxidizing gas to come swirling through the annular inlet into the nozzle throat and the interior of the electrode 204.

During the operation of the anode torch 200, the flow of the oxidizing gas (preferably air) past the open end of the tubular electrode 204 causes a reduced pressure zone within the tubular electrode that draws the oxidizing gas up into the tubular electrode 204. Thus, the plasma arc of the torch 200 attaches to the inner cylindrical surface 210 of the tubular electrode and, due to the swirling motion or rotation of the oxidizing gas, the arc attachment point rotates about the inner cylindrical surface of the electrode. By changing the flow rates of the oxidizing gas passing through the anode torch 200, the reduced pressure of the partial vacuum created within the tubular electrode can be varied and thereby the axial location of the arc attachment point within the tubular electrode 204 can also be varied. Thus, the arc attachment point within the tubular electrode, in addition to constantly rotating about the inner cylindrical surface 210 of the electrode 204, can be moved axially along the inner cylindrical surface 210 of the electrode at the same time to reduce electrode erosion. One method of causing the arc attachment point to move axially within the tubular electrode is to cause a pulsation of the oxidizing gas passing through the anode torch 200 by means of a conventional gas flow regulator.

The start-up and operation of the plasma melting, combustion and incinerating system of the present invention using the tubular electrode anode torch 200 rather than the button electrode anode torch 100 is basically the same as that described above in connection with the button electrode anode torch 100. However, after initiating the operation to the tubular electrode anode torch 200 using argon gas, the plasma gas for the torch is switched to an oxidizing gas (preferably air, although steam or oxygen could also be used) when the cathode torch is switched from argon gas to nitrogen.

The use of air as the plasma gas in the tubular electrode torch 200, rather than argon, forms a higher energy or stronger plasma jet than the argon gas plasma jet formed using the button electrode anode torch 100. In addition, the flow rates of the air through the tubular electrode anode torch 200 will be greater than the flow rates of the argon through the anode torch 100. Thus, the plasma jet, formed by the tubular electrode anode torch 200, is stronger than the plasma jet formed by the button electrode anode torch 100 and it is anticipated that the tubular electrode anode torch 200, with its higher energy or stronger, plasma jet, in many instances can be operated with the discharge end of its nozzle at the same level as the discharge end of the cathode torch nozzle without arc attachment of the anode plasma jet to the nozzle portion 228 of the torch 200. In addition, the oxygen in the plasma jet of the tubular electrode anode torch 200 causes better combustion of organic materials, such as, organic scrap, than the plasma jet of the button electrode anode torch.

Figure 11:
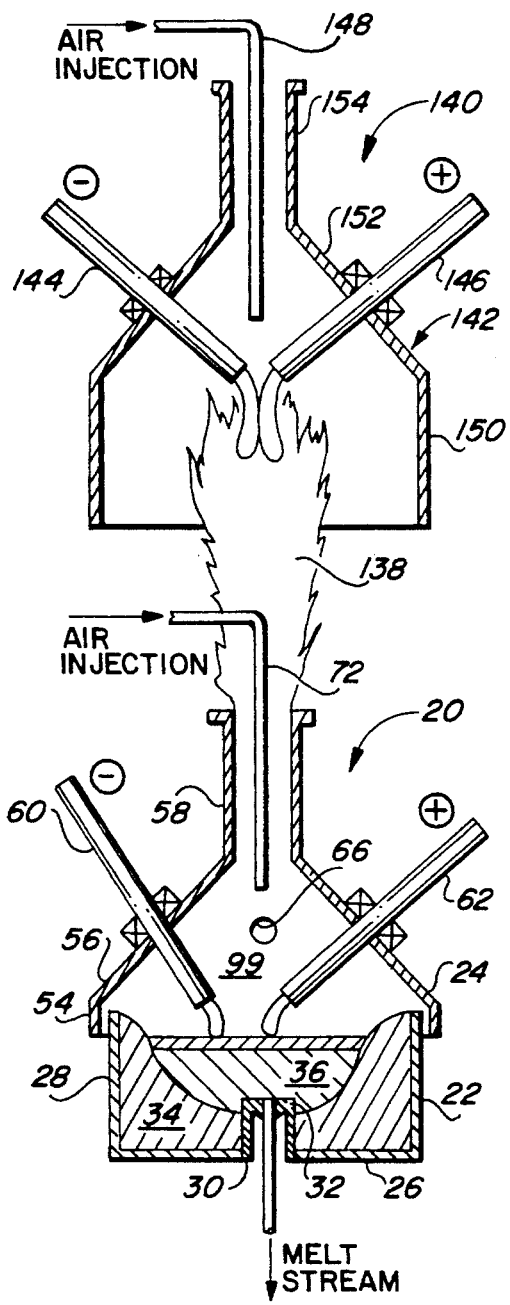
FIG. 11 is a schematic view, in elevation, of the plasma arc furnace of the present invention with a plasma arc afterburner.

FIG. 11 shows an embodiment of the present invention for treating exhaust gases 138 from the plasma arc furnace 20. The plasma arc furnace 20 has been used to process certain materials with no detectable volatile organic compounds present in the exhaust gases 138. Thus, the plasma arc furnace 20 effectively destroys the organic in these materials and no further pollution abatement equipment or bag house for the collection of particulate fume is required. However, it is contemplated that some scrap materials with very high organic content could require further processing to insure that all of the organic has been destroyed.

The embodiment of the invention shown in FIG. 11 includes a plasma arc afterburner 140 to assure complete combustion of the organic in the material being processed. A conventional afterburner can also be used.

The afterburner 140 consists of a hood 142, a pair of plasma torches 144 and 146, and an air, oxygen or steam injection tube 148. The hood has a cylindrical base 150, a conical midsection 152 and an exhaust stack 154. The plasma torches 144 and 146 are mounted in the conical midsection 152 of the hood in the same way the torches 60 and 62 are mounted in the plasma arc furnace 20 and operate in the same manner as the torches 60 and 62. The air, oxygen or steam injection tube 148 is used in the same manner as the air, oxygen or steam injection tube 72 of the furnace 20 to enhance the combustion of any organic in the exhaust gases.

In operation, the exhaust gases 138 from the plasma arc furnace 20 are introduced into base of the hood where they pass upward past the torches 144 and 146. The torches then burn off any remaining organic in the exhaust gases. The exhaust gases are then discharged through the exhaust stack 154 to the atmosphere.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

We claim:

1. In a method of heating materials in a plasma arc furnace which is equipped with at least two transferred arc plasma torches of opposite polarities, one of said torches being a cathode torch comprising a cathode electrode and a nozzle for emitting a cathode plasma jet, one of said torches being an anode torch comprising an anode electrode and a nozzle for emitting an anode plasma jet, and a melter shell for holding the materials, the improvement comprising:

positioning a plasma jet discharge end of the anode torch nozzle farther above an upper surface of the materials in the melter shell than a plasma jet discharge end of the cathode torch nozzle during transfer of current between the torches through a coupling zone to heat the materials.

2. The method of claim 1 wherein: an oxidizing gas is introduced into the coupling zone for greater combustion efficiency.

3. The method of claim 2 wherein: the oxidizing gas is air.

4. The method of claim 2 wherein: the oxidizing gas is oxygen.

5. The method of claim 2 wherein: the oxidizing gas is steam.

6. The method of claim 1, wherein: the melter shell is generally cylindrical in shape, has a vertical, longitudinal axis, and has an open top; and a hood carrying the torches is positioned over the open top of the melter shell;

the discharge end of the cathode torch nozzle is offset from the vertical, longitudinal axis of the melter shell;

the materials to be heated are introduced into the melter shell at a location offset from the vertical, longitudinal axis of the melter shell; and the materials to be heated are passed beneath the discharge end of the cathode torch nozzle before the materials to be heated are passed beneath the discharge end of the anode torch nozzle.

7. The method of claim 6 wherein: the temperature of materials being processed in the melter shell is controlled by adjusting the distance that the cathode torch nozzle is offset from the vertical longitudinal axis of the melter shell with an increase in the distance lowering the temperature of the materials being processed and a decrease in the distance increasing the temperature of the materials being processed.

8. The method of claim 6 wherein: the discharge end of the anode torch nozzle is located approximately on the vertical, longitudinal vertical axis of melter shell.

9. The method of claim 1 wherein:

the melter shell is generally cylindrical in shape, has a vertical, longitudinal axis, is open at the top and is provided with a hood over the open top of the melter shell;

during initiation of the heating of the materials in the melter shell, the discharge end of the cathode torch nozzle is located approximately on the vertical, longitudinal axis of the melter shell and the discharge end of the anode torch nozzle is offset with respect to the vertical, longitudinal axis of the melter shell while current is transferred between the torches through the coupling zone to heat the materials;

after melting of the materials in the melter shell is initiated, the discharge end of the cathode torch nozzle is moved to be located offset relative to the vertical, longitudinal axis of the melter shell and the discharge end of the anode torch is moved to be located approximately on the vertical, longitudinal axis of the melter shell.

10. The method of claim 9 wherein:

after the melting of the materials in the melter shell is initiated, additional materials to be melted are introduced into the melter shell at a location offset with respect to the vertical, longitudinal axis of the melter shell; and the melter shell is rotated to rotate the materials to be melted relative to the plasma torches such that the materials to be melted pass beneath the discharge end of the cathode torch nozzle before the materials to be melted pass beneath the discharge end of the anode torch nozzle.

11. The method of claim 10 wherein: molten material is discharged from the melter shell through a discharge outlet in the bottom of the melter shell located along the vertical, longitudinal axis of the melter shell and a residence time of materials being processed in the melter is increased by introducing the materials into the melter farther from the vertical, longitudinal axis of the melter, 12. The method of claim 10 wherein: during initiation of the heating of the materials in the melter shell the cathode plasma jet and the anode plasma jet are coupled together in the coupling zone with the current being transferred directly between the plasma jets and with the material being heated by convection of hot plasma gases from the plasma jets and radiated heat from the plasma jets, 13. The method of claim 12 wherein: after the melting of the materials in the melter shell is initiated the materials are located in the coupling zone and the cathode plasma jet and the anode plasma jet are coupled together by the materials in the coupling zone with the current being transferred between the plasma jets by passing through the materials in the coupling zone whereby the materials are melted by ohmic-heat generation in the materials, 14. The method of claim 1 wherein: the cathode plasma jet and the anode plasma jet are coupled together in the coupling zone with the current being transferred directly between the plasma jets and with the material being heated by convection of hot plasma gases from the plasma jets and radiated heat from the plasma jets.

15. The method of claim 1 wherein: the materials are located in the coupling zone and the cathode plasma jet and the anode plasma jet are coupled together by the materials in the coupling zone with the current being transferred between the plasma jets by passing through the materials in the coupling zone whereby the materials are melted by ohmic-heat generation in the materials.

16. The method of claim 1 wherein: the anode torch uses an oxidizing gas as a plasma gas.

17. The method of claim 6, wherein: the anode torch uses an oxidizing gas as a plasma gas.

18. The method of claim 14, wherein: the anode torch uses air as a plasma gas.

19. The method of claim 15, wherein: the anode torch uses air as a plasma gas.

20. A plasma arc melter for melting materials comprising at least two transferred arc plasma torches of opposite polarities, one of said torches being a cathode torch comprising a cathode electrode and a nozzle for emitting a cathode plasma jet, and one of said torches being an anode torch comprising an anode electrode and a nozzle for emitting an anode plasma jet; means for locating a discharge end of the cathode nozzle and a discharge end of the anode nozzle relative to each other for the transfer of current between the torches through a coupling zone to heat the materials and means for supplying current to the torches; a rotatable, generally cylindrical melter shell for holding the materials, said melter shell having a vertical, longitudinal axis, said melter shell having a bottom wall, a sidewall and an open top; a non-rotating melter hood located over the open top of the melter shell, and the plasma torches being mounted in the melter hood; the improvement comprising:

the discharge end of the cathode torch nozzle being offset relative to the vertical, longitudinal axis of the melter shell;

the melter hood having a materials feed port offset relative to the vertical, longitudinal axis of the melter shell for introducing the materials to be heated into the melter shell at a location offset from the vertical, longitudinal axis; and means for rotating the melter shell such that the materials introduced into the melter shell of the plasma arc melter through the feed port pass beneath the discharge end of the cathode torch nozzle before passing beneath the discharge end of the anode torch nozzle.

21. The plasma arc melter of claim 20 wherein: a gap is located between the open top of the melter shell and the melter hood to permit combustion air into the plasma arc melter, the melter shell and the melter hood are vertically moveable relative to each other to adjust the size of the gap, and means is provided for moving the melter shell and the melter hood relative to each other to regulate the amount of combustion air being introduced into the plasma arc melter.

22. In a method of heating materials in a plasma arc furnace which is equipped with at least two transferred arc plasma torches of opposite polarities, one of said torches being a cathode torch comprising a cathode electrode and a nozzle for emitting a cathode plasma jet, one of said torches being an anode torch comprising an anode electrode and a nozzle for emitting an anode plasma jet, and a melter shell for holding the materials, the improvement comprising:

positioning a plasma jet discharge end of the anode torch nozzle and a plasma jet discharge end of the cathode torch above an upper surface of the materials in the melter shell; transferring current between the torches through a coupling zone to heat the materials; injecting an oxidizing gas into the coupling zone for greater combustion efficiency; and deflecting the plasma jets with the injected oxidizing gas to keep the plasma jets from contacting the discharge ends of the torches.

23. In a method of heating materials in a plasma arc furnace which is equipped with at least two transferred arc plasma torches of opposite polarities, one of said torches being a cathode torch comprising a cathode electrode and a nozzle for emitting a cathode plasma jet, another of said torches being an anode torch comprising an anode electrode and a nozzle for emitting an anode plasma jet, a melter shell for holding the materials, the melter shell being generally cylindrical in shape and having an open top with a vertical axis, a non-rotating hood carrying the torches located over the open top of the melter shell, and means to rotate the shell about the vertical axis to rotate the materials relative to the torches, the improvement comprising:

positioning a plasma jet discharge end of the anode torch nozzle at least as far away from the upper surface of the materials in the melter shell as a plasma discharge end of the cathode torch nozzle during the transfer of current between the torches through a coupling zone to heat the materials;

offsetting the discharge end of the cathode torch nozzle from the vertical axis of the melter shell;

introducing the materials to be heated into the melter shell at a location offset from the vertical axis of the melter shell; and rotating the melter shell to pass the materials introduced into the melter shell at the location offset from the vertical axis of the melter shell beneath the discharge end of the cathode torch nozzle before the materials pass beneath the discharge end of the anode torch nozzle.

24. A plasma arc melter for melting materials comprising at least two transferred arc plasma torches of opposite polarities, one of said torches being a cathode torch comprising a cathode electrode and a nozzle for emitting a cathode plasma jet, and one of said torches being an anode torch comprising an anode electrode and a nozzle for emitting an anode plasma jet; means for locating a discharge end of the cathode nozzle and a discharge end of the anode nozzle relative to each other for the transfer of current between the torches through a coupling zone to heat the materials and means for supplying current to the torches; the plasma arc melter having a melter shell having a bottom wall, a sidewall and an open top; a melter hood located over the open top of the melter shell, and the plasma torches being mounted in the melter hood; the improvement comprising: means for introducing an oxidizing gas into the coupling zone for greater combustion efficiency comprising the anode torch which has a tubular electrode and uses an oxidizing gas as a plasma gas for the anode plasma jet; the anode torch having a collar with spiral channels that guide the plasma gas, give the plasma gas a rotational motion within the tubular electrode and cause an arc attachment point of the anode plasma jet to rotate about an inner cylindrical surface of the tubular electrode.

25. A plasma arc melter for melting materials comprising at least two transferred arc plasma torches of opposite polarities, one of said torches being a cathode torch comprising a cathode electrode and a nozzle for emitting a cathode plasma jet, and one of said torches being an anode torch comprising an anode electrode and a nozzle for emitting an anode plasma jet; means for locating a discharge end of the cathode nozzle and a discharge end of the anode nozzle relative to each other for the transfer of current between the torches through a coupling zone to heat the materials and means for supplying a current to the torches; a generally cylindrical melter shell for holding the materials, said melter shell having a bottom wall and said melter shell having an open top, a melter hood located over the open top of the melter shell, and the plasma torches being mounted in the melter hood; the improvement comprising: means for introducing an oxidizing gas into the coupling zone comprising an injection tube mounted on an outside surface of at least one of the torches through which the oxidizing gas is introduced into the existing plasma jet as the plasma jet exits the discharge end of the torch nozzle.

26. A plasma arc melter for melting materials comprising at least two transferred arc plasma torches of opposite polarities, one of said torches being a cathode torch comprising a cathode electrode and a nozzle for emitting a cathode plasma jet, and one of said torches being an anode torch comprising an anode electrode and a nozzle for emitting an anode plasma jet; means for locating a discharge end of the cathode nozzle and a discharge end of the anode nozzle relative to each other for the transfer of current between the torches through a coupling zone to heat the materials and means for supplying current to the torches; a generally cylindrical melter shell for holding the materials, said melter shell having a bottom wall and an open top; a melter hood located over the open top of the melter shell, and the plasma torches being mounted in the melter hood; the improvement comprising: a means for introducing an oxidizing gas into the coupling zone comprising a shroud mounted on at least one of the torches through which the oxidizing gas is introduced into the existing plasma jet as the plasma jet exits the discharge end of the torch nozzle.

* * * * *